(12) United States Patent
Yajima et al.

(10) Patent No.: US 8,792,928 B2
(45) Date of Patent: Jul. 29, 2014

(54) RADIO COMMUNICATION SYSTEM, RADIO BASE STATION, AND MOBILE STATION CONTROL METHOD

(75) Inventors: Tatsuro Yajima, Kawasaki (JP);
Hidehiko Oyane, Yokohama (JP);
Akihito Hanaki, Yokohama (JP);
Daisuke Tanigawa, Kawasaki (JP)

(73) Assignee: NTT DoCoMo, Inc., Tokyo (JP)

( * ) Notice: Subject to any disclaimer, the term of this patent is extended or adjusted under 35 U.S.C. 154(b) by 782 days.

(21) Appl. No.: 12/353,352

(22) Filed: Jan. 14, 2009

(65) Prior Publication Data
US 2009/0181714 A1  Jul. 16, 2009

(30) Foreign Application Priority Data
Jan. 16, 2008  (JP) ................ P2008-007219

(51) Int. Cl.
| | | |
|---|---|---|
| H04B 1/00 | (2006.01) |
| H04B 7/00 | (2006.01) |
| H04W 36/00 | (2009.01) |
| H04W 72/00 | (2009.01) |
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04L 12/28 | (2006.01) |
| H04B 7/005 | (2006.01) |
| H04W 4/00 | (2009.01) |
| H04B 7/216 | (2006.01) |
| H04L 27/00 | (2006.01) |

(52) U.S. Cl.
USPC ............ 455/522; 455/69; 455/437; 455/450; 370/252; 370/278; 370/328; 370/335; 370/342; 375/146; 375/259

(58) Field of Classification Search
CPC ..... H04W 28/12; H04W 28/16; H04W 52/04; H04W 52/16; H04W 52/32; H04W 52/34; H04W 52/42; H04W 52/54; H04W 52/58; H04W 52/60; H04W 52/146; H04W 52/241; H04W 52/0216; H04W 52/262; H04W 52/267; H04W 52/322; H04W 52/367; H04W 52/386; H04W 72/042; H04W 72/082; H04W 72/1284; H04L 1/0002; H04L 1/0011; H04L 1/0015; H04L 1/0016; H04L 1/0025; H04L 1/0028; H04L 1/0039; H04L 1/0041; H04L 1/0055; H04L 1/0006
USPC ............ 455/7, 13.4, 68, 69, 70, 127.1, 127.2, 455/404.1, 404.2, 405, 418, 419, 420, 437, 455/439, 442, 446, 447, 452.1, 452.2, 455, 455/456.1, 456.2, 515, 517, 522; 370/230, 370/244, 310, 318, 320, 328, 329, 331, 332, 370/334, 335, 336, 337, 341, 342, 348, 394, 370/395.4, 506
See application file for complete search history.

(56) References Cited

U.S. PATENT DOCUMENTS

| | | | |
|---|---|---|---|
| 6,781,970 B1 * | 8/2004 | Ovesjo et al. ............. 370/328 |
| 6,904,290 B1 * | 6/2005 | Palenius .................. 455/522 |
| 7,149,245 B2 * | 12/2006 | Budka et al. ............. 375/227 |
| 7,209,749 B2 * | 4/2007 | Kwak et al. ............. 455/452.2 |
| 7,352,709 B2 * | 4/2008 | Wakabayashi ............ 370/278 |
| 8,073,451 B2 * | 12/2011 | Nobukiyo ................ 455/450 |
| 2002/0061764 A1 * | 5/2002 | Kim et al. ................ 455/522 |
| 2002/0115464 A1 * | 8/2002 | Hwang et al. ............ 455/522 |
| 2003/0232622 A1 * | 12/2003 | Seo et al. ................. 455/437 |
| 2005/0220042 A1 * | 10/2005 | Chang et al. ............. 370/278 |
| 2006/0176866 A1 | 8/2006 | Wakabayashi |

| E-TFCI | E-DCH CATEGORY #2 | E-DCH CATEGORY #4 | E-DCH CATEGORY #6 |
|---|---|---|---|
| 1 | β ed, 1 (2, 1), β ed, 2 (2, 1), β ed, 3 (2, 1), ... β ed, 8 (2, 1) | β ed, 1 (4, 1), β ed, 2 (4, 1), β ed, 3 (4, 1), ... β ed, 8 (4, 1) | β ed, 1 (6, 1), β ed, 2 (6, 1), β ed, 3 (6, 1), ... β ed, 8 (6, 1) |
| 2 | β ed, 1 (2, 2), β ed, 2 (2, 2), β ed, 3 (2, 2), ... β ed, 8 (2, 2) | β ed, 1 (4, 2), β ed, 2 (4, 2), β ed, 3 (4, 2), ... β ed, 8 (4, 2) | β ed, 1 (6, 2), β ed, 2 (6, 2), β ed, 3 (6, 2), ... β ed, 8 (6, 2) |
| 3 | β ed, 1 (2, 3), β ed, 2 (2, 3), β ed, 3 (2, 3), ... β ed, 8 (2, 3) | β ed, 1 (4, 3), β ed, 2 (4, 3), β ed, 3 (4, 3), ... β ed, 8 (4, 3) | β ed, 1 (6, 3), β ed, 2 (6, 3), β ed, 3 (6, 3), ... β ed, 8 (6, 3) |
| : | FOR UE CATEGORY #2, E-TFCI IS UP TO E-TFCI=44. | FOR UE CATEGORY #4, E-TFCI IS UP TO E-TFCI=73. | |
| 124 | − | − | β ed, 1 (6, 124), β ed, 2 (6, 124), β ed, 3 (6, 124), ... β ed, 8 (6, 124) |
| 125 | − | − | β ed, 1 (6, 125), β ed, 2 (6, 125), β ed, 3 (6, 125), ... β ed, 8 (6, 125) |

| | | | | |
|---|---|---|---|---|
| 2007/0232318 | A1* | 10/2007 | Nobukiyo | 455/450 |
| 2008/0159184 | A1* | 7/2008 | Niwano | 370/278 |
| 2010/0128663 | A1* | 5/2010 | Kuroda et al. | 370/328 |

FOREIGN PATENT DOCUMENTS

| | | |
|---|---|---|
| JP | 2006-311528 A | 11/2006 |
| JP | 2007-267070 A | 10/2007 |
| WO | WO 2007043455 A1 * | 4/2007 |

OTHER PUBLICATIONS

3GPP TS 25.309 V6.6.0 (Mar. 2006), 3rd Generation Partnership Project; Technical Specification Group Radio Access Network; FDD Enhanced Uplink; Overall description; Stage 2 (Release 6), 34 pages.
The office communication of Jun. 29, 2011, issued in the counterpart Korean patent application.
The Japanese office action issued on Feb. 14, 2012 in the counterpart Japanese patent application.
The Japanese office action issued on Jul. 3, 2012 in the counterpart Japanese patent application.
3GPP; "Physical layer procedures (FDD)"; Technical Specification Group Radio Access Network; TS 25.214 V7.3.0 Release 7; pp. 1-60; Valbonne, France (Dec. 2006).

* cited by examiner

*Primary Examiner* — Bobbak Safaipour
*Assistant Examiner* — Paul P Tran
(74) *Attorney, Agent, or Firm* — Marvin A. Motsenbocker; Mots Law, PLLC (57) ABSTRACT

A radio base station includes: a table storage unit storing a table in which an E-TFCI indicating a transport format combination indicator of the physical data channel to be transmitted by a mobile station is associated with $\beta$ed that is used to determine a SG and is an offset value of transmission power of the physical data channel to be transmitted by the mobile station; a parameter selector selecting the $\beta$ed associated with the E-TFCI from the table; and a communication controller determining a SG based on the $\beta$ed thus selected and an E-TFCI associated with the selected $\beta$ed, and controlling transmission power of the mobile station by using the SG thus determined.

3 Claims, 4 Drawing Sheets

| E-TFCI | E-DCH CATEGORY #2 | E-DCH CATEGORY #4 | E-DCH CATEGORY #6 |
|---|---|---|---|
| 1 | $\beta$ ed, 1 (2, 1),<br>$\beta$ ed, 2 (2, 1),<br>$\beta$ ed, 3 (2, 1),<br>...<br>$\beta$ ed, 8 (2, 1) | $\beta$ ed, 1 (4, 1),<br>$\beta$ ed, 2 (4, 1),<br>$\beta$ ed, 3 (4, 1),<br>...<br>$\beta$ ed, 8 (4, 1) | $\beta$ ed, 1 (6, 1),<br>$\beta$ ed, 2 (6, 1),<br>$\beta$ ed, 3 (6, 1),<br>...<br>$\beta$ ed, 8 (6, 1) |
| 2 | $\beta$ ed, 1 (2, 2),<br>$\beta$ ed, 2 (2, 2),<br>$\beta$ ed, 3 (2, 2),<br>...<br>$\beta$ ed, 8 (2, 2) | $\beta$ ed, 1 (4, 2),<br>$\beta$ ed, 2 (4, 2),<br>$\beta$ ed, 3 (4, 2),<br>...<br>$\beta$ ed, 8 (4, 2) | $\beta$ ed, 1 (6, 2),<br>$\beta$ ed, 2 (6, 2),<br>$\beta$ ed, 3 (6, 2),<br>...<br>$\beta$ ed, 8 (6, 2) |
| 3 | $\beta$ ed, 1 (2, 3),<br>$\beta$ ed, 2 (2, 3),<br>$\beta$ ed, 3 (2, 3),<br>...<br>$\beta$ ed, 8 (2, 3) | $\beta$ ed, 1 (4, 3),<br>$\beta$ ed, 2 (4, 3),<br>$\beta$ ed, 3 (4, 3),<br>...<br>$\beta$ ed, 8 (4, 3) | $\beta$ ed, 1 (6, 3),<br>$\beta$ ed, 2 (6, 3),<br>$\beta$ ed, 3 (6, 3),<br>...<br>$\beta$ ed, 8 (6, 3) |
| ... | FOR UE CATEGORY #2, E-TFCI IS UP TO E-TFCI=44. | FOR UE CATEGORY #4, E-TFCI IS UP TO E-TFCI=73. | |
| 124 | – | – | $\beta$ ed, 1 (6, 124),<br>$\beta$ ed, 2 (6, 124),<br>$\beta$ ed, 3 (6, 124),<br>...<br>$\beta$ ed, 8 (6, 124) |
| 125 | – | – | $\beta$ ed, 1 (6, 125),<br>$\beta$ ed, 2 (6, 125),<br>$\beta$ ed, 3 (6, 125),<br>...<br>$\beta$ ed, 8 (6, 125) |

| ABSOLUTE GRANT VALUE | INDEX |
|---|---|
| $(168/15)^2 \times 6$ | 31 |
| $(150/15)^2 \times 6$ | 30 |
| $(168/15)^2 \times 4$ | 29 |
| $(150/15)^2 \times 4$ | 28 |
| $(134/15)^2 \times 4$ | 27 |
| $(119/15)^2 \times 4$ | 26 |
| $(150/15)^2 \times 2$ | 25 |
| ⋮ | ⋮ |
| $(34/15)^2$ | 9 |
| $(30/15)^2$ | 8 |
| $(27/15)^2$ | 7 |
| $(24/15)^2$ | 6 |
| $(19/15)^2$ | 5 |
| $(15/15)^2$ | 4 |
| $(11/15)^2$ | 3 |
| $(7/15)^2$ | 2 |
| ZERO_GRANT* | 1 |
| INACTIVE* | 0 |

RADIO COMMUNICATION SYSTEM, RADIO BASE STATION, AND MOBILE STATION CONTROL METHOD

BACKGROUND OF THE INVENTION

1. Field of the Invention

The present invention relates to a radio communication system, a radio base station, and a mobile station control method controlling a mobile station using a transmission power ratio between an uplink physical data channel and an uplink physical control channel.

2. Description of the Related Art

The third generation partnership project (3GPP) has been studying and creating a specification of the third generation mobile phone system based on a code division multiple access (CDMA) scheme, and has defined an enhanced uplink (EUL) in which an uplink communication rate is increased (e.g. "3GPP TS 25.309 V.6.6.0 FDD Enhanced Uplink Overall description Stage 2 (Release 6)," 3GPP, March, 2006).

EUL uses a physical channel such as a physical data channel, i.e., an enhanced dedicated physical data channel (E-DPDCH), and a physical control channel, i.e., an enhanced dedicated physical control channel (E-DPCCH). Further, in EUL, a radio base station informs a mobile station of a maximum allowable transmission power ratio between an E-DPDCH and an E-DPCCH, as a scheduling grant (SG).

When determining a SG, the radio base station needs to recognize βed being a transmission power offset per transport format combination indicator (E-TFCI) in a mobile station. A radio network controller (RNC) informs the radio base station of parameters necessary for the calculation of βed (e.g. Reference E-TFCI, and Reference E-TFCI Power Offset) through a Node B Application Part (NBAP) message. In addition, the RNC notifies the mobile station of the parameters through a radio resource control (RRC) message.

However, a method of determining the above-described scheduling grant (SG) has the following problem. That is, when determining the SG, the radio base station must calculate a βed for each E-TFCI for each call generated between itself and the mobile station on the basis of the parameters informed by the RNC. Further, the radio base station must create a correspondence table for the SG and E-TFCI. Alternatively, the radio base station must calculate the SG on the basis of a receivable transport block (TB) size as a resource of the radio base station for each scheduling.

Therefore, the radio base station has a problem that processing load is increased due to the calculation needed to determine the SG.

In light of this problem, the present invention has been made, and an object thereof is to provide a radio communication system, a radio base station, and a mobile station control method that are capable of reducing processing load on a determination of the scheduling grant (SG) being a maximum allowable transmission power ratio between the physical data channel (E-DPDCH) and the physical control channel (E-DPCCH) defined for the mobile station, while using existing messages between a radio network controller and a radio base station, and between the radio network controller and the mobile station.

SUMMARY OF THE INVENTION

To solve the above-described problem, the present invention has the following features. A first feature of the present invention is summarized in that a radio communication system (radio communication system 10) includes: a radio base station(radio base station 100) configured to control a mobile station (mobile station 300A, 300B) by using a transmission power ratio (scheduling grant) between an uplink physical data channel (E-DPDCH) and an uplink physical control channel (E-DPCCH); and a radio network controller (radio network controller 200) connected to the radio base station and configured to control the radio base station and the mobile station, the radio base station includes: a storage unit (table storage unit 111) configured to store a table (E-TFCI/βed table TB) in which a transport format combination indicator (E-TFCI) of the physical data channel transmitted by the mobile station is associated with a transmission power offset (βed) that is an offset value of transmission power of the physical data channel to be transmitted by the mobile station and is used to determine the transmission power ratio; a selector (parameter selector 107) configured to select a transmission power offset associated with the transport format combination indicator from the table; and an informing unit (a baseband signal processor 103 and a network I/F unit 105) configured to inform the radio network controller of predetermined parameters (e.g., Reference E-TFCI and Reference E-TFCI PowerOffset) to be used to determine the transmission power ratio, the predetermined parameters being based on the transmission power offset selected by the selector, and the transport format combination indicator associated with the transmission power offset thus selected, and the radio network controller includes: a receiver (network I/F unit 201) configured to receive the predetermined parameters informed by the informing unit; and a parameter informing unit (parameter informing unit 203) configured to inform the mobile station of parameters that are used to control the transmission power of the mobile station, and include the predetermined parameters received by the receiver.

In accordance with this radio communication system, in the radio base station, the table is stored in which a transmission power offset is associated with a transport format combination indicator of the physical data channel to be transmitted by the mobile station. Therefore, the radio base station neither needs to calculate a transmission power offset for the transport format combination indicator for each call generated between itself and the mobile station, nor needs to create a correspondence table for the transmission power ratio and the transport format. Further, based on the transport format combination indicator associated with the selected transmission power offset, predetermined parameters to be used to determine the transmission power offset can be transmitted and received with a message between the existing radio network controller and the radio base station, and between the radio base station and the mobile station.

That is, in accordance with the radio communication system, while using a message between the existing radio network controller and the radio base station and between the radio base station and the mobile station, processing load can be reduced, the processing load being related to the determination of scheduling grant (SG) which is a maximum transmission power ratio, allowable for the mobile station, between the physical data channel (E-DPDCH) and the physical control channel (E-DPCCH).

A second feature of the present invention is summarized in that a radio base station controls a mobile station by using a transmission power ratio between an uplink physical data channel and an uplink physical control channel, the radio base station including: a storage unit configured to store a table in which a transport format combination indicator of the physical data channel transmitted by the mobile station is associated with a transmission power offset that is an offset value of transmission power of the physical data channel to be transmitted by the mobile station and is used to determine the transmission power ratio; a selector configured to select, from the table, a transmission power offset associated with the transport format combination indicator; and a base station controller (communication controller 109) configured to determine the transmission power ratio based on the transmission power offset selected by the selector and the transport format combination indicator associated with the transmission power offset thus selected, and control transmission power of the mobile station using the transmission power ratio thus determined.

In accordance with the second feature, a third feature of the present invention is summarized in that the radio base station includes an informing unit configured to inform the radio network controller of predetermined parameters to be used to determine the transmission power ratio, the predetermined parameters being based on the transmission power offset selected by the selector, and the transport format combination indicator associated with the transmission power offset thus selected.

In accordance with the third feature, a fourth feature of the present invention is summarized in that the informing unit informs the radio network controller 200 of the predetermined parameter including a Reference E-TFCI, and a Reference E-TFCI Power Offset associated with the Reference E-TFCI.

A fifth feature of the present invention is summarized in that a mobile station control method controls a mobile station by using a transmission power ratio between an uplink physical data channel and an uplink physical control channel the mobile station control method comprising the steps of: selecting a transmission power offset associated with a transport format combination indicator, on the basis of a table in which the transport format combination indicator of the physical data channel to be transmitted by the mobile station is associated with the transmission power offset, the transmission power offset being an offset value of transmission power of the physical data channel to be transmitted by the mobile station; and determining the transmission power ratio based on the transmission power offset selected by the selector and on the transport format combination indicator associated with the transmission power offset thus selected, and controlling transmission power of the mobile station by using the transmission power ratio thus determined.

In accordance with the features of the present invention, it is possible to provide a radio communication system, a radio base station, and a mobile station control method enabling a reduction of processing load on a determination of the scheduling grant (SG) being a maximum transmission power ratio between the physical data channel (E-DPDCH) and the physical control channel (E-DPCCH), the ratio being allowable for the mobile station, while using message between an existing radio network controller and a radio base station, and between the radio network controller and a mobile station.

DETAILED DESCRIPTION OF THE PREFERRED EMBODIMENTS

Next, an embodiment of the present invention is described. More specifically, the following are described: (1) Entire Schematic Configuration of Radio Communication System, (2) Functional Block Configuration of Radio Base Station, (3) Functional Block Configuration of Radio Network Controller, (4) Operation of Radio Communication System, (5) Advantageous Effects, and (6) Other embodiments.

In the following description of the drawings, the same or similar parts will be denoted by the same or similar reference numerals. However, it should be noted that the drawings are schematic and ratios of dimensions and the like are different from actual ones.

Therefore, specific dimensions and the like should be determined by taking into consideration the following description. Moreover, as a matter of course, also among the drawings, there are included portions in which dimensional relationships and ratios are different from each other.

(1) Entire Schematic Configuration of Radio Communication System

Figure 1:
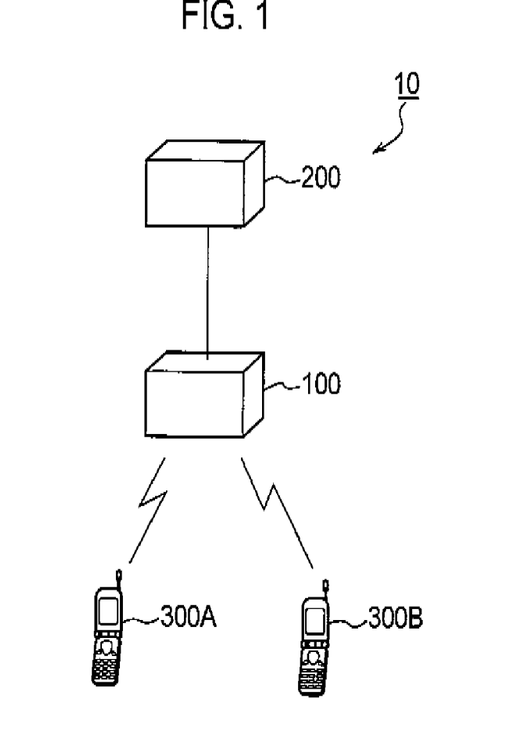
FIG. 1 is a diagram showing an entire schematic configuration of a radio communication system 10 of an embodiment of the present invention.

FIG. 1 is a diagram showing an entire schematic configuration of a radio communication system 10 according to an embodiment of the present invention. As shown in FIG. 1, a radio communication system 10 includes a radio base station 100, a radio network controller 200 (hereinafter, referred to as RNC 200), and mobile stations 300A and 300B. Incidentally, the number of radio base stations and the number of mobile stations included in the radio communication system 10 are not limited to the numbers shown in FIG. 1.

The radio communication system 10 employs a radio communication scheme, i.e. a W-CDMA scheme, defined in the 3rd generation partnership project (3GPP). Further, in the radio communication system 10, an enhanced uplink (EUL) is introduced in which transmission rate of uplink data is increased.

The radio base station 100 performs radio communication with the mobile stations 300A and 300B. Particularly, in this embodiment, the radio base station 100 controls transmission power of radio signals transmitted by the mobile stations 300A and 300B, for each transmission time interval (TTI). To be more precise, the radio base station 100 controls the mobile stations 300A and 300B using a transmission power ratio, scheduling grant (SG) to be more specific, between an enhanced dedicated physical data channel (E-DPDCH) being an uplink physical data channel, and an enhanced dedicated physical control channel (E-DPCCH) being a physical control channel.

The RNC 200 is connected to the radio base station 100. The RNC 200 controls the radio base station 100, and the mobile stations 300A and 300B.

In particular, in this embodiment, using the Node-B application part (NBAP), the RNC 200 acquires, from the radio base station 100, a parameter (e.g. Reference E-TFCI PowerOffset) or the like to be used in the control of the s transmission power of the mobile stations 300A and 300B. In addition, using the radio resource control (RRC), the RNC 200 transmits the parameter to be used in the control of the transmission power of the mobile stations 300A and 300B to the mobile stations 300A and 300B.

The mobile stations 300A and 300B perform radio communication with the radio base station 100. The mobile stations 300A and 300B adjust transmission power of a radio signal transmitted to the radio base station 100, on the basis of the control by the radio base station 100 and of the parameter informed by the RNC 200.

(2) Functional Block Configuration of Radio Base Station

Figure 2:
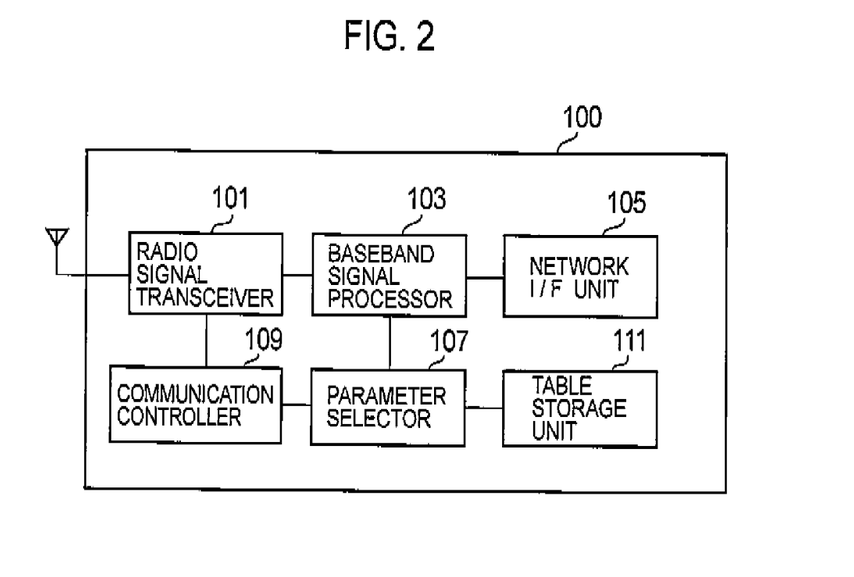
FIG. 2 is a functional block diagram of a radio base station 100 of an embodiment of the present invention.

FIG. 2 is a functional block diagram of a radio base station 100 thereof. As shown in FIG. 2, the radio base station 100 includes a radio signal tranceiver 101, a baseband signal processor 103, a network I/F unit 105, a parameter selector 107, a communication controller 109, and a table storage unit 111. Incidentally, only parts related to the present invention are chiefly described below. Accordingly, it should be noted that in some cases, the radio base station 100 includes a block (a power supply unit or the like) which is not shown or not described, but which is essential to implement functions as the radio base station 100.

The radio signal tranceiver 101 transmits and receives a radio signal in accordance with the W-CDMA scheme to and from the mobile stations 300A and 300B. Further, the radio signal tranceiver 101 performs an exchange between a radio signal and a baseband signal.

The baseband signal processor 103 performs a processing on a baseband signal. Particularly, in this embodiment, based on βed being a transmission power offset selected by the parameter selector 107, and a combination, i.e., an enhanced-transport format combination indicator (E-TFCI), of a transport format associated with the βed thus selected, the baseband signal processor 103 notifies the RNC 200 of predetermined parameters (e.g. Reference E-TFCI, and Reference E-TFCI PowerOffset) to be used to determine the SG. In this embodiment, an informing unit is configured by the baseband signal processor 103 and the network I/F unit 105.

βed is used to determine the SG, and is an offset value of the transmission power of E-DPDCH transmitted by the mobile stations 300A and 300B. As defined in 3GPP TS25.214 Section 5.1.2.5B.2.3, βed is calculated using (Eq. 1).

$$\underset{A}{\boxed{\beta_{ed,i,harq}}} = \underset{B}{\boxed{\beta_{ed,ref}}} \underset{C}{\boxed{\sqrt{\frac{L_{e,ref}}{L_{e,i}}}}} \underset{D}{\boxed{\sqrt{\frac{K_{e,i}}{K_{e,ref}}}}} \underset{E}{\boxed{\cdot 10^{\left(\frac{\Delta harq}{20}\right)}}} \quad \text{(Eq. 1)}$$

Where i represents an index of E-TECI being a target, and ref represents a maximum index of Reference E-TFCI, not exceeding i.

To determine the transmission power offset βed, the s following parameters are used:
 (i) Puncture Limit
 (ii) Reference E-TFCI
 (iii) Reference E-TFCI PowerOffset
 (iv) E-DCH HARQ Offset
 (v) Maximum Set of E-DPDCHs
 (vi) E-TFCI Table Index
 (vii) E-TTI E-TFCI Table Index and E-TTI are parameters defining (designating) a table of E-TFCI used for the calculation of the transmission power offset, and have no influence on the calculation of the transmission power offset. In a calculation using (Eq. 1), it is assumed that a table of E-TFCI has been determined using E-TFCI Table Index and E-TTI.

In (Eq. 1), Part A represents a power offset for each E-TFCI other than Reference E-TFCI. Part B represents a transmission power offset (Reference E-TFCI PowerOffset) for Reference E-TFCI.

Part C represents the number of used codes, which is uniquely determined using Puncture Limit and Maximum Set of E-DPDCHs. Part D represents TB size for each E-TFCI, which is uniquely determined using E-TFCI Table Index and E-TTI. Part E represents, for each E-TFCI, a transmission power offset applied to the whole E-TFCI, which is uniquely determined using E-DCH HARQ Offset.

Further, when using a plurality of E-DPDCHs, e.g., in the case of SF=2, the transmission power offset of E-DPDCH is given by (Eq. 2).

$$\sqrt{2} \times \beta_{ed,i,harq} \quad \text{(Eq. 2)}$$

That is, the eventual value of the transmission power offset is a value acquired by adding up transmission power offsets of respective E-DPDCHs.

Further, the baseband signal processor 103 informs the RNC 200 of predetermined parameters (i) to (iv) out of the above-described parameters.

The network I/F unit 105 provides a network interface to perform communication with the RNC 200. More specifically, the network I/F unit 105 includes a wired LAN interface and the like.

From an E-TFCI/βed table TB (refer to FIG. 5) stored in the table storage unit 111, the parameter selector 107 selects βed associated with E-TFCI. In this embodiment, the parameter selector 107 configures a selector.

In this embodiment, the parameter selector 107 holds the above-described parameters (i) to (iii) for each E-DCH category of a mobile station (UE). Moreover, the parameter selector 107 holds a fixed value as the parameter (iv). This fixed value is defined for each MAC-d flow in the radio communication system 10. Therefore, the parameter selector 107 can hold βed in the E-TFCI/βed table TB without performing calculation.

The communication controller 109 controls communication with the mobile stations 300A and 300B. Particularly, in this embodiment, based on the βed selected by the parameter selector 107 and on an E-TFCI associated with the selected βed, the communication controller 109 determines a transmission power ratio, i.e. the scheduling grant (SG), between E-DPDCH and E-DPCCH transmitted by the mobile station 300A (300B).

In addition, the communication controller 109 controls the transmission power of the mobile station 300A (300B) using the SG determined above. In this embodiment, the communication controller 109 configures a base station controller.

Figure 5:
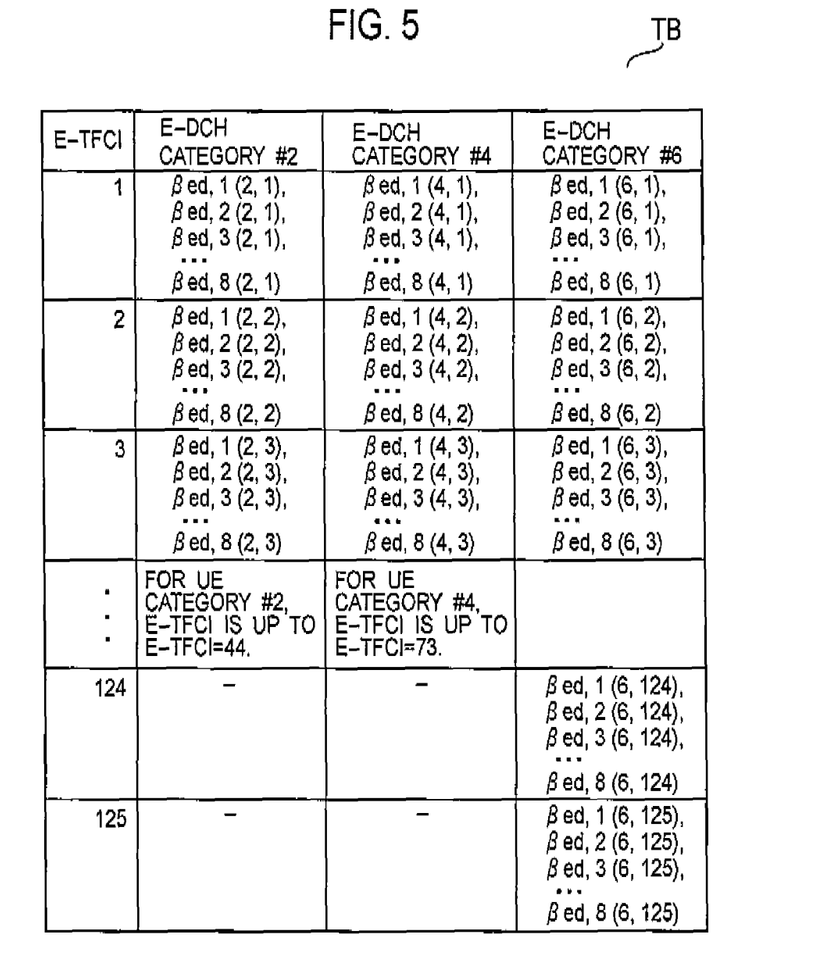
FIG. 5 is a diagram showing an example of E-TFCI/βed table (TB) of the embodiment of the present invention.

The table storage unit 111 stores the E-TFCI/βed table TB (refer to FIG. 5). As shown in FIG. 5, on the E-TFCI/βed table TB, E-TFCI is associated with βed. In this embodiment, on the E-TFCI/βed table TB, for each E-DCH category of a mobile station (US) (E-DCH categories #2, #4, and #6), a combination of βed and a MAC-d flow associated with each E-TFCI (E-TFCIs 1 to 125) is shown.

In the E-TFCI/βed table TB, subscripts subsequent to βed represent the ID number of a MAC-d flow. The maximum number of settable MAC-d flows is S. For example, to MAC-d #1, a data channel (DTCH) is set as a logic channel, and to MAC-d #2, a control channel (DCCH) is set. Alternatively, to MAC-d #1 and #2, DTCHs may be respectively set, and to MAC-d #3, a DCCH may be set.

Incidentally, depending on the E-DCH category, TTI and TB size used are different, and a maximum transmission rate is also different. For example, in E-DCH category #6, the maximum transmission rate becomes about 5.76 Mbps.

Figure 6:
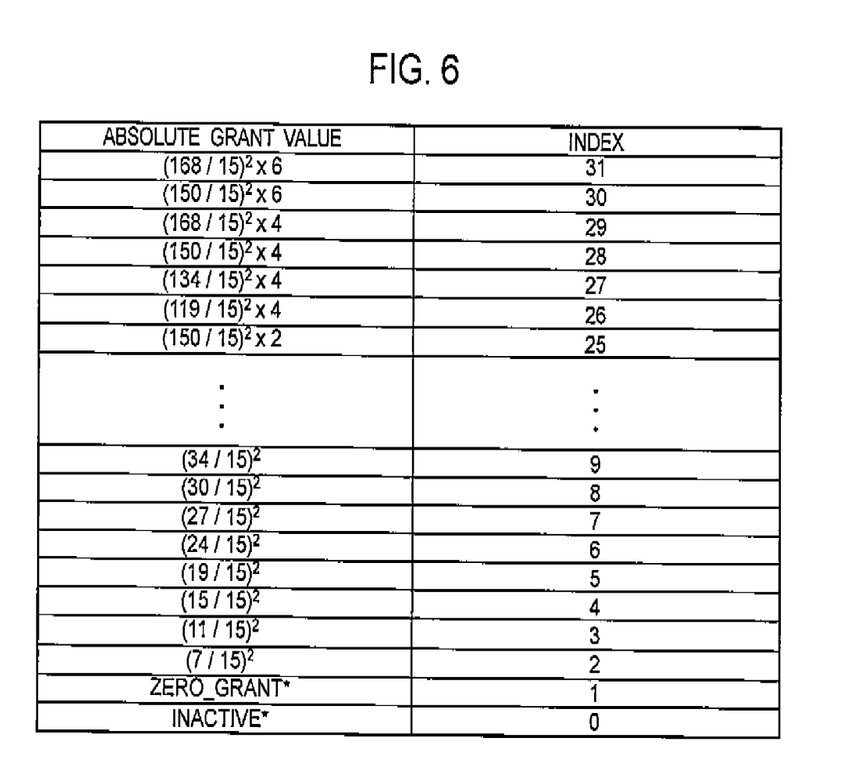
FIG. 6 is a diagram showing an example of an absolute grant value table (TS25.212 Table 16B) defined in 3GPP.

FIG. 6 shows an example of an absolute grant value table (TS25.212 Table 16B) defined in 3GPP. On the absolute grant value table, the value of an absolute grant (AG) and an index of an enhanced-absolute grant channel (E-AGCH) are associated with each other. Here, for βed associated with each E-TFCI, a maximum AG satisfying (Eq. 3) is determined to be the SG.

$$\beta_{ed}(m,n)^2 \geq AG\ Value \qquad (Eq.\ 3)$$

Where m represents E-DCH category, and an n represents an index of E-TFCI.

In this manner, a fixed table on which each E-TFCI and an index of E-TFCI are associated with each other can be held as in the case of the E-TFCI/βed table TB shown in FIG. 5.

(3) Functional Block Configuration of Radio Network Controller

Figure 3:
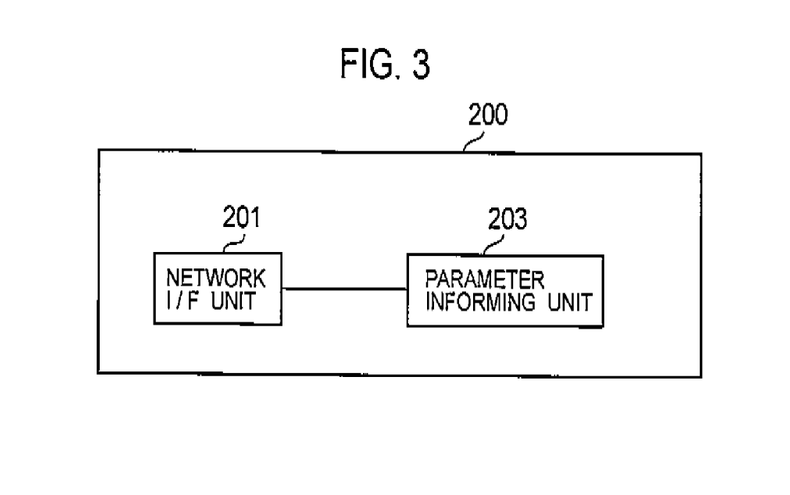
FIG. 3 is a functional block diagram of a radio network controller (RNC) 200 of an embodiment of the present invention.

FIG. 3 is the functional block diagram of the RNC. As shown in FIG. 3, the RNC 200 includes a network I/F unit 201 and a parameter informing unit 203. Incidentally, only parts related to the present invention are chiefly described below. Accordingly, it should be noted that in some cases, the RNC 200 includes a block (a power supply unit or the like) which is not shown or not described, but which is essential to implement functions as the RNC 200.

The network I/F unit 201 provides a network interface to achieve communication with the radio base station 100, and with the mobile stations 300A and 300B via the radio base station 100. To be more precise, the network I/F unit 201 includes a wired LAN and the like.

Particularly, in this embodiment, the network I/F unit 201 receives predetermined parameters, i.e. parameters (i) to (iv) of the parameters described above, informed by the radio base station 100 (baseband signal processor 103). In this embodiment, the network I/F unit 201 includes a receiver and the like.

The parameter informing unit 203 informs the mobile station 300A (300B) of parameters to be used to control transmission power of the mobile station 300A (300B), the parameters including those received by the network I/F unit 201 That is, the parameter informing unit 203 informs the mobile station 300A (300B) of parameters necessary for the setting of βed.

More specifically, the parameter informing unit 203 acquires parameters (i) to (iv) ((i) Puncture Limit, (ii) Reference E-TFCI, (iii) Reference E-TFCI PowerOffset, and (iv) E-DCH HARQ Offset) received by the network I/F unit 201 using the Node-B application part (NBAP). Further, the parameter informing unit 203 informs the mobile station 300A (300B), using the radio resource control (RRC), of the parameters (i) to (iv) received by the network I/F unit 201, and of the parameters (v) to (vii) described above ((v) Maximum Set of E-DPDCHs, (vi) E-TFCI Table Index, and (vii) E-TTI).

(4) Operation of Radio Communication System

Next, operation of the radio communication system 10 is described. More specifically, described is operation by which the radio base station 100 and the RNC 200 control the transmission power of the mobile station 300A.

Figure 4:
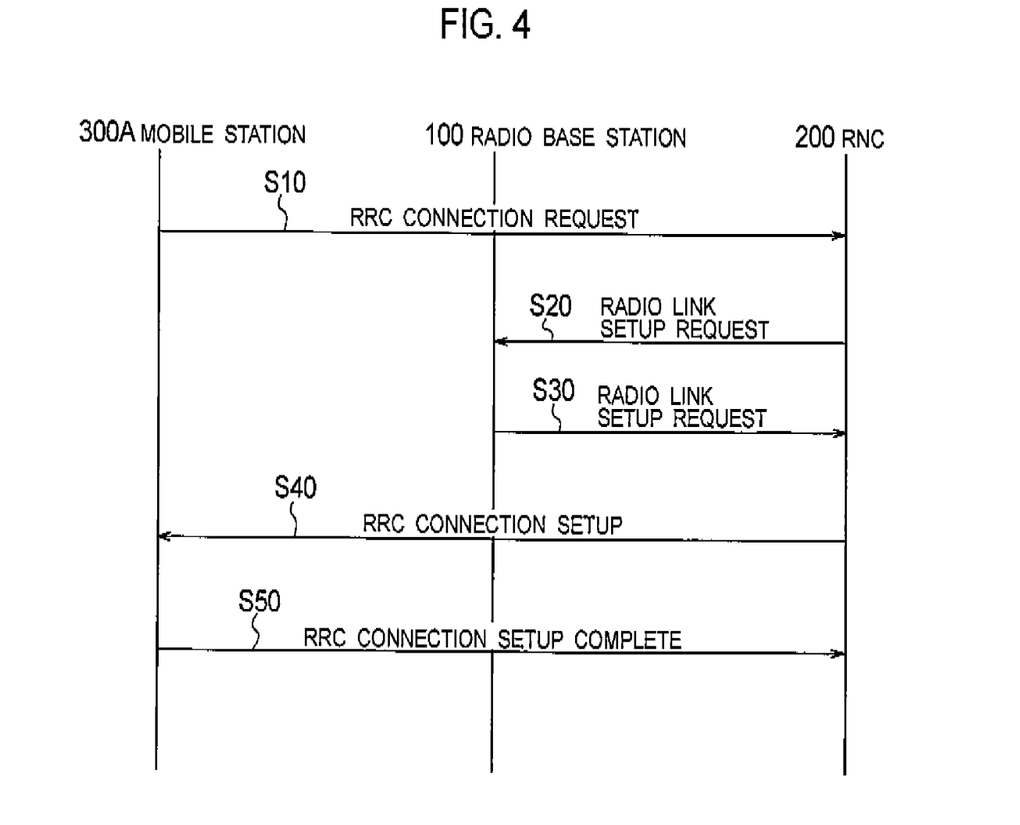
FIG. 4 is a diagram showing a communication sequence performed so that the radio base station 100 and the RNC 200 control the transmission power of a mobile station 300 in an embodiment of the present invention.

FIG. 4 shows a communication sequence performed so that the radio base station 100 and the RNC 200 control the transmission power of the mobile station 300A. As shown in FIG. 4, in Step S10, the mobile station 300A transmits an RRC connection setup request to the RNC 200 to transmit and receive a radio signal to and from the radio base station 100.

In Step S20, based on the RRC setup request received from the mobile station 300A, the RNC 200 requests the radio base station 100 to set a radio communication path. To be more precise, using the Node-B application part (NBAP), the RNC 200 transmits a Radio Link setup request to the radio base station 100.

In Step S30, based on the Radio Link setup request received from the RNC 200, the radio base station 100 selects parameters necessary for the setting of the radio communication path (RL) to the mobile station 300A, and informs the RNC 200 of the selected parameters.

Particularly, in this embodiment, the radio base station 100 informs the RNC 200 of parameters necessary for the setting of βed, i.e., (i) Puncture Limit, (ii) Reference E-TFCI, (iii) Reference E-TFCI PowerOffset, and (iv) E-DCH HARQ Offset.

Referring to the E-TFCI/βed table TB shown in FIG. 5, the radio base station 100 selects parameters necessary for the setting of βed. Using the Node-B application part (NBAP), the radio base station 100 transmits a Radio Link setup response including the selected parameters to the RNC 200.

In Step S40, based on the RL setup response received from the radio base station 100, the RNC 200 informs the mobile station 300A of parameters necessary for the setting of βed. To be more precise, using the radio resource control (RRC), the RNC 200 transmits an RRC connection setup including the parameters (i) to (vii) to the mobile station 300A.

In Step S50, based on the RRC connection setup received from the RNC 200, the mobile station 300A sets βed, and transmits an "RRC connection setup complete" to the RNC 200. Note that the mobile station 300A controls the transmission power of the radio signal transmitted to the radio base station 100 in accordance with the set βed.

(5) Advantageous Effects

In accordance with the radio communication system 10, in the radio base station 100, the E-TFCI/βed table TB on which E-TFCI of E-DPDCH transmitted from the mobile station 300A (300B), and βed are associated with each other is stored. Therefore, the radio base station 100 neither needs to calculate βed for E-TFCI for each call generated between itself and the mobile station 300A (300B), nor needs to create a correspondence table for SG and E-TFCI. Further, based on E-TFCI associated with the selected βed, predetermined parameters to be used to determine SG can be transmitted and received with a message between the existing radio network controller and the radio base station, and between the radio base station and the mobile station.

That is, in accordance with the radio communication system 10, processing load related to the determination of SG can be reduced while using a message between the existing radio network controller and the radio base station and between the radio base station and the mobile station.

(6) Other Embodiments

As described above, the present invention has been set forth in the embodiment. But it should not be understood that the discussion and the drawings constituting a part of this disclosure are interpreted to limit the present invention. It is apparent to the skilled person that various alternatives, modifications, and the practices can be achieved based on this disclosure.

For example, in this embodiment, a configuration taken is that on the E-TFCI/βed table TB, for the E-DCH categories #2, #4, and #6, a combination of βed, a data channel (DTCH), and a control channel (DCCH) associated with each E-TFCI (E-TFCIs 1 to 125) is shown. However, the E-TFCI/βed table TB does not necessarily need to take the format shown in FIG. 5 as long as E-TFCI and βed are associated with each other.

It should be understood that this invention may be embodied in other various forms that are not described herein. Accordingly, the present embodiments are to be considered in all respects as illustrative and not restrictive, the scope of the invention being indicated by the appended claims rather than by the foregoing description.

Note that the entire contents of the Japanese Patent Application No. 2008-007219, filed on Jan. 16, 2008, are incorporated herein by reference.

What is claimed is:

1. A radio base station for controlling a mobile station by using a transmission power ratio between an uplink physical data channel and an uplink physical control channel, the radio base station comprising:
- a storage unit configured to store a table containing both a transport format combination indicator of the physical data channel transmitted by the mobile station and an associated transmission power offset that is an offset value of transmission power of the physical data channel to be transmitted by the mobile station and that is used to determine the transmission power ratio, the table being stored for each category of mobile stations;
- a selector configured to select, from the table corresponding the category of the mobile station, a transmission power offset associated with the transport format combination indicator;
- a base station controller configured to determine the transmission power ratio based on the transmission power offset selected by the selector and the transport format combination indicator associated with the transmission power offset thus selected, and control transmission power of the mobile station using the transmission power ratio thus determined; and
- an informing unit configured to inform the radio network controller of predetermined parameters to be used to determine the transmission power ratio, the predetermined parameters being determined based on the transmission power offset selected by the selector, and the transport format combination indicator associated with a selected transmission power offset.

2. The radio base station according to claim 1, further comprising an informing unit configured to inform the radio network controller of predetermined parameters to be used to determine the transmission power ratio, the predetermined parameters being based on the transmission power offset selected by the selector, and the transport format combination indicator associated with the transmission power offset thus selected.

3. The radio base station according to claim 2, wherein the informing unit informs the radio network controller of the predetermined parameters including a Reference Enhanced Dedicated Channel (E-DCH) Transport Format Combination Indicator (E-TFCI), and a Reference E-TFCI Power Offset associated with the Reference E-TFCI.

* * * * *